(12) United States Patent
Lang et al.

(10) Patent No.: US 12,151,619 B2
(45) Date of Patent: *Nov. 26, 2024

(54) VIEW SYSTEM FOR CAPTURING A VEHICLE ENVIRONMENT

(71) Applicant: MEKRA LANG GMBH & CO. KG, Ergersheim (DE)

(72) Inventors: Werner Lang, Ergersheim (DE); Andreas Redlingshöfer, Trautskirchen (DE); Andreas Enz, Burgbernheim (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/127,978

(22) Filed: Mar. 29, 2023

(65) Prior Publication Data

US 2023/0234501 A1 Jul. 27, 2023

Related U.S. Application Data

(63) Continuation of application No. 16/222,811, filed on Dec. 17, 2018, now Pat. No. 11,643,011.

(30) Foreign Application Priority Data

Dec. 19, 2017 (DE) .......................... 102017130566.1

(51) Int. Cl.
*H04N 5/262* (2006.01)
*B60R 1/25* (2022.01)
(Continued)

(52) U.S. Cl.
CPC .................. *B60R 1/26* (2022.01); *B60R 1/25* (2022.01); *H04N 5/2628* (2013.01);
(Continued)

(58) Field of Classification Search
CPC . B60R 1/00; B60R 2300/30; B60R 2300/303; B60R 2300/306;
(Continued)

(56) References Cited

U.S. PATENT DOCUMENTS 6,232,910 B1 * 5/2001 Bell .......................... G01S 13/18
342/134
2006/0250225 A1 11/2006 Widmann et al.
(Continued)

FOREIGN PATENT DOCUMENTS

DE 102010033786 1/2012
DE 10 2010 032 411 2/2012
(Continued)

OTHER PUBLICATIONS

English Translation of Lang et al. (EP-2623374-A1). (Year: 2013).*
(Continued)

*Primary Examiner* — Matthew K Kwan
(74) *Attorney, Agent, or Firm* — Cozen O'Connor (57) ABSTRACT

A view system for a vehicle (1) with a tractor (2) and a trailer (3). The view system has a capture unit (10) with an image sensor (12) for capturing image data of an area of view, around the vehicle, a processing unit (20) for processing the image data, and a reproduction unit (30) for reproducing at least one first image section (410) and one second image section (420) of the area of view (40) captured by the capture unit (10). The processing unit provides different resolutions of image data depending on the position of the tractor with respect to the trailer.

22 Claims, 6 Drawing Sheets

(51) Int. Cl.
*B60R 1/26* (2022.01)
*H04N 23/698* (2023.01)
*H04N 23/80* (2023.01)

(52) U.S. Cl.
CPC ......... *H04N 23/698* (2023.01); *H04N 23/815* (2023.01); *B60R 2300/30* (2013.01); *B60R 2300/303* (2013.01); *B60R 2300/306* (2013.01); *B60R 2300/70* (2013.01); *B60R 2300/802* (2013.01); *B60R 2300/8046* (2013.01); *B60Y 2200/148* (2013.01)

(58) Field of Classification Search
CPC .......... B60R 2300/70; B60R 2300/802; B60R 2300/8046; B60R 2300/10; B60R 2300/20; B60R 1/26; B60R 1/25; H04N 5/2628; H04N 23/698; H04N 23/815; H04N 23/57; H04N 7/183; B60Y 2200/148; B60Y 2200/221; B60K 35/00
USPC ........................................................ 348/148
See application file for complete search history.

(56) References Cited

U.S. PATENT DOCUMENTS

| | | | |
|---|---|---|---|
| 2008/0036875 A1* | 2/2008 | Jones ................ | H04N 23/63 348/E7.086 |
| 2010/0182432 A1* | 7/2010 | Augst ................ | B60R 1/00 348/148 |
| 2010/0295937 A1* | 11/2010 | Longobardi ......... | G06T 11/00 348/118 |
| 2014/0278263 A1 | 9/2014 | Stone | |
| 2016/0167583 A1* | 6/2016 | Schrepfer .......... | B60R 11/04 348/148 |
| 2016/0260238 A1 | 9/2016 | Lang et al. | |

FOREIGN PATENT DOCUMENTS

| | | | |
|---|---|---|---|
| DE | 10 2013 214 368 | 1/2015 | |
| DE | 10 2013 214 369 | 1/2015 | |
| DE | 10 2014 006 153 | 10/2015 | |
| DE | 10 2014 018 040 | 6/2016 | |
| DE | 10 2015 218 033 | 3/2017 | |
| DE | 102017108569 | 10/2018 | |
| EP | 2623374 | 8/2013 | |
| EP | 2623374 A1 * | 8/2013 | ............ B60R 1/00 |
| EP | 3028898 | 6/2016 | |
| EP | 3392692 | 10/2018 | |
| JP | H 05-258623 | 10/1993 | |
| JP | 2014-533630 | 12/2014 | |
| JP | 2016-107985 | 6/2016 | |
| JP | 2016-119526 | 6/2016 | |
| JP | 2016-168877 | 9/2016 | |
| JP | 2016-530150 | 9/2016 | |
| JP | 2017-105439 | 6/2017 | |
| JP | 2017-215936 | 12/2017 | |

OTHER PUBLICATIONS

Translation of Lang et al., EP2623374A1 (Aug. 7, 2013), [0021], [0032], [0035], [0039] and fig. 5. (Year: 2013).

United Nations "Agreement Concerning the Adoption or Uniform Technical Prescriptions for Wheeled Vehicles, Equipment and Parts which can be Fitted and/or be Used on Wheeled Vehicles and the Conditions for Reciprocal Recognition or Approvals Granted on the Basis of these Prescriptions," Addendum 45, Regulation 46, Revision 5, "Uniform provisions concerning the approval or devices for indirect vision and or motor vehicles with regard to the installation of these devices," Aug. 19, 2013, 65 pages.

* cited by examiner

VIEW SYSTEM FOR CAPTURING A VEHICLE ENVIRONMENT

CROSS REFERENCE TO RELATED APPLICATIONS

This application is a continuation of U.S. patent application Ser. No. 16/222,811 which was filed with the U.S. Patent and Trademark Office on Dec. 17, 2018. Priority is claimed for this invention and application, corresponding application having been filed in Germany on Dec. 19, 2017, No. 10 2017 130 566.1.

BACKGROUND OF THE INVENTION

1. Field of the Invention

The invention relates to a view system for capturing an environment around a vehicle, in particular a commercial vehicle with a semi-trailer, a trailer or another section which is rotatable with respect to the driver's cabin and extends to the back.

2. Description of the Related Art

From the prior art, mirrors which are attachable and are attached, respectively, to the outer side of a driver's cabin and a tractor, respectively, are known. With mirrors, the driver may (at least partially) monitor the vehicle environment around the trailer by a corresponding head movement during sheering out of the trailer, such as during cornering or turning.

A trailer in the sense of the present disclosure comprises trailers which are coupled to a vehicle (tractor machine and tractor unit, respectively) by means of a trailer coupling, for example, trailers which are put on the rear, lowered portion of a tractor and, thus, are rotatably connected to at least a vertical axis. In general words, a trailer is a section which extends to the back, is disposed behind the driver's cabin of a vehicle and is a part of the vehicle which is laterally movable (sheerable) relative to the driver's cabin and which rotates relatively to the driver's cabin around a vertical axis during cornering. Articulated frame steerer or articulated trains are also trailers in the sense of the invention.

In recent times, vehicle mirrors are more and more replaced by camera systems (mirror replacement systems) or at least complemented by camera systems. In this respect, common mirror systems which are prescribed for a vehicle, such as exterior rear view mirrors (main mirrors), inside rear view mirrors in passenger cars or wide angle mirrors and front mirrors at commercial vehicles, are replaced or complemented. With such mirror replacement systems, the corresponding field of view which is commonly made visible by a mirror is shown to the driver of the vehicle occasionally permanent and in real time on a monitor or another reproduction unit, e.g. inside the vehicle, such that the driver of the vehicle may view into the corresponding field of view at any time, although he has neither direct view into the corresponding field of view nor a mirror is provided. Further, camera systems at vehicles are established within the framework of so-called advanced driver assistance systems (ADAS) with which either the data captured by the camera systems, such as dependent on the correspondingly present driving situation, are also shown to the driver of the vehicle or with which the captured image data are interpreted, in order to control other components of the vehicle, such as within the framework of distance and/or obstacle detection, driving lane condition detection, tracking stability assistance, traffic sign detection, etc.

From the prior art, in particular mirror replacement systems for commercial vehicles with tractor and trailer are known which have two or more cameras each with different opening angles for capturing different fields of view, usually fields of view in the class II and IV according to the ECE R46. Normally, these cameras are stationary connected to the tractor of the vehicle. View systems with two cameras are either configured such that at least one of the two cameras for capturing the vehicle environment is rotated around a vertical axis (normal axis) during horizontal orientation of the vehicle, if the trailer has a different orientation to the tractor, i.e., if the trailer is not disposed in the longitudinal axis of the tractor. A rotating mechanism, however, is susceptible to damages due to environment influences and mechanical influences, such as vibrations. Alternatively, the vehicle environment to be captured is cut-out from the area of view of the camera for the wide angle portion and is depicted on the monitor in an enlarged manner, if view systems with two cameras are used and the trailer has a different orientation to the tractor. However, the camera for the wide angle portion has a low basis resolution due to the large image capture angle why the image portion cut-out from the wide angle portion also has a low resolution which does not provide a reliable evaluation of the vehicle environment. Further alternatively, with view systems with two cameras, the area of view of the camera for the main field of view is rotated digitally within the main field of view, whereby, however, only a limited capturing of the vehicle environment is possible and extreme kink angles between the tractor and the trailer are occasionally not captured due to a limited maximum capture angle of the camera.

A view system which has two cameras for capturing two different fields of view and at least one monitor for reproducing the fields of view is, for instance, known from DE 10 2015 218 033 A1. The view system disclosed therein is configured such that it adapts the monitor image such that a sufficient backward view is still ensured. The adaptation of the monitor image occurs either by mechanically rotating the corresponding camera and, thus, the capturing field of the camera or by displacing one of the image sections of the corresponding camera image shown on the monitor by using of calculation and control apparatuses and suitable image processing programs. Further methods and apparatuses for reproducing a lateral and/or backward environment portion of a vehicle are known form DE 10 2013 214 368 A1 and DE 10 2013 214 369 A1.

With vehicles with camera systems and trailers, however, there is the problem that the driver cannot sufficiently monitor a portion adjacent (next) to the vehicle, if the trailer has a different orientation to the tractor, that is, if the angles of the tractor longitudinal axis are different to the trailer longitudinal axis, because, with using camera systems, a movement of the head does not result in a displacement of the environment portion captured by the camera.

SUMMARY OF THE INVENTION

Therefore, it is an object of the present invention to provide a camera based view system for a vehicle, in particular a commercial vehicle with tractor and trailer, which allows the driver a reliable evaluation of the environment around the vehicle, in particular around the trailer, at any time.

The invention is based on the idea to provide a view system for a vehicle with a tractor and a trailer which comprises a capture unit with at least one image sensor for capturing an area of view around the vehicle in the form of image data, at least one processing unit for processing the image data captured by the capture unit and at least one reproduction unit for reproducing a first image section and a second image section of the area of view captured by the capture unit. The capture unit is attachable and attached, respectively, to the tractor in a stationary and stable manner, i.e., the capture unit has exactly one predefined operating position relative to the tractor. The processing unit is configured such that it takes out/picks out the first image section at a first original position and the second image section at a second original position from the area of view of the at least one image sensor, if the tractor and the trailer are substantially aligned in longitudinal direction of the vehicle, i.e., the angle between the tractor and the trailer is 0°, and takes out/picks out the first image section at a first modified position and/or the second image section at a second modified position, if the tractor and the trailer are arranged to each other in an angle substantially unequal 0°. In this respect, the resolution of the first image section at the original position and at the modified position on the reproduction unit is always higher than the resolution of the second image section at the original position and at the modified positon on the reproduction unit.

Thus, the view system according to the invention is based on the idea to extract at least two image sections, i.e., at least a first and a second image section, from a single area of view captured by the image capture unit, the positions of the first and the second image sections varying within the area of view of the image sensor dependent on the position of the trailer relative to the tractor. If the vehicle drives straight ahead or performs a straight backward driving, wherein the trailer is arranged behind the tractor such that it is substantially aligned with the tractor in the longitudinal direction of the vehicle and the angle between the tractor and the trailer is around 0°, both image sections shown on the reproduction unit are each disposed at an original position which allows the driver to reliably monitor and evaluate the environment around the vehicle and in particular around the trailer. During cornering, such as during cornering over land, turning or during maneuvering, the trailer sheers out. This leads to an orientation of the trailer relative to the tractor which differs from the orientation of the trailer. The tractor and the trailer then include an angle unequal 0°, in particular significantly differing from 0°. In order to ensure that the driver can still reliably view into the environment around the trailer, the processing unit takes at least one of the at least two image sections, i.e., either the first or the second image section, from the area of view at a modified position within the area of view. In other words, the processing unit correspondingly cuts-out and extracts, respectively, an image at a different position from the area of view of the image capture unit and the image sensor, respectively, during sheering out of the trailer, what allows the driver a reliable evaluation of the environment around the trailer also with sheered out, angled arrangement of the trailer to the tractor. The term "area of view" means the surface of the sensors on which the vehicle environment is captured and, thus, is depicted, i.e., the processing unit takes the portions at different positions of the image sensor in the original and the modified state, respectively.

In accordance with one embodiment, a view system is described for use with a vehicle with a tractor and a trailer. The view system comprises: a capture unit for capturing an area of view around the vehicle in form of image data, wherein the capture unit is attachable to the tractor, wherein the capture unit has a single cam-era having a single image sensor; at least one processing unit for processing the image data captured by the capture unit; and at least one reproduction unit for reproducing at least one first image section and one second image section of the area of view captured by the capture unit. Each reproduction unit has a defined first display portion for reproduction of the first image section and a defined second display portion for reproduction of the second image section. The first image section comprises a main field of view and the second image section comprises a wide angle field of view, wherein the second image section comprises the first image section, wherein, if the tractor and the trailer are substantially aligned in the longitudinal direction of the vehicle, the processing unit takes the first image section at a first original position (A) and the second image section at a second original position (B) from the area of view of the at least one image sensor, and wherein, if the tractor and the trailer are arranged in an angle substantially unequal 0° to each other, the processing unit takes the first image section at a first modified position (A') and/or the second image section at a second modified position (B') from the area of view of the at least one image sensor, and wherein the resolution of the first image section at the original position (A) and at the modified position (A') on each reproduction unit is higher than the resolution of the second image section at the original position (B) and at the modified position (B') on the reproduction unit.

The term "substantially aligned" refers not only to an exactly aligned arrangement of tractor and trailer (i.e., an arrangement wherein the angle between the tractor and the trailer is exactly)0°, but also to an arrangement of tractor and trailer which includes small deviations from 0° and, thus, is not fixedly limited to exactly 0°, preferably 40°, further preferably 30° and still further preferably 15°. The deviations which are to be subsumed under the term "substantially aligned" are dependent on various operational parameter, such as the steering angle or the speed, and, thus, are dependent on the corresponding operational situation and, thus, are variable. Also, the term "substantially unequal 0°" is not limited to all angles which differ from 0°, but rather refers to angles which are detected dependent on the above-mentioned input values, at which a capturing of the vehicle environment is insufficient, preferably angels-angles between 90° (trailer is disposed perpendicularly to the tractor) and 40°, further preferably 50°, still further preferably 60°, still further preferably 65°.

Take out, cut-out and extract presently means that a digital displacement of the corresponding image section within the entire area of view occurs such that another, modified image section which differs from the original image section is at least partially selected and taken out from the single area of view of the image capture unit. As a result, a further image section is read out from the area of view which differs from the original image section at least partially. Thus, a mechanical rotating and moving, respectively, of parts of the camera is avoided. The system of view is robust in view of environment influences, such as vibrations, and may be manufactured in a cost-efficient way.

The single area of view which has both the first and the second image section is either generated by means of a calculation program, if a plurality of cameras is used, or is recorded "at once" by a single camera with a single sensor and a suitable lens arrangement and geometry. By generating and recording, respectively, a single area of view which has both the first and also the second image section and which is configured such that it captures a vehicle environment even with the maximum sheering out of the trailer, thus, a digital rotating over the entire area of view may occur. Thus, it is possible to displace the image sections also in case of maximum sheering out of the trailer such that the environment around the rear end of the trailer in main driving direction is still viewable for the driver.

In order to allow the driver always a reliable evaluation of the environment around the trailer, it is necessary that the at least one first image section always has a higher resolution at each position, i.e. at the original position and at the modified position, on the reproduction unit than the second or each further image section on the reproduction unit. Thus, the resolution of the first image section on the reproduction unit always has to be higher than the resolution of the at least one second image section on the reproduction unit, independent on whether only the first image section is taken out at a modified position from the area of view or whether only the second or each further image section is taken out at a modified position from the area of view or both the first and the second image section are taken out at a first and at a second modified position from the area of view due to sheering out of the trailer. Thus, it is ensured that the driver can always view the first image section in a sufficiently sharp manner on the reproduction unit.

The higher resolution in the first image section compared to the second image section can be generated on the reproduction unit by processing the image data (data processing by means of the processing unit). Preferably, however, the higher resolution is achieved in that the area of view of the image sensor has a high resolution with constant good quality over its entire surface and that the first image section is depicted with this high resolution on the reproduction unit, while the second image section is reduced in its size for a depiction on the reproduction unit and, thus, is depicted on the reproduction unit with a lower resolution than the first image section. In other words, the size of the second image section during reproduction is reduced in view of the size of the second image section during capturing, while the size of the first image section during reproduction stays constant in view of the size of the first image section during capturing or is only reduced to an extent which lies above the reduction extent of the second image section. It is also conceivable that to enlarge the size of the first image section during reproduction in view of the first image section during capturing. In principle, it applies that the size of the second image section during reproduction on the reproduction unit always has to be scaled down such that the resolution resulting from the scaling is lower than the resolution of the first image section during reproduction. By the relative downsizing of one of the image sections depicted on the reproduction unit, this image section has a lower resolution than the image section which is less downsized relatively thereto.

The term "resolution" may mean the number of pixels on a certain surface. Preferably, the term "resolution", however, means "resolution referred to line pairs per length unit", e.g. mm, as it may be described by means of a modulation transfer function (MTF) which is defined as the relation of image contrast to object contrast or the relation of the real image contrast to the ideal image contrast during viewing given line patterns.

The processing unit serves for image processing and image editing (e.g. the selection of suitable sizes of the first and the second image sections such that the criterion that the resolution of the first image section during depiction on the reproduction unit is always higher than the resolution of the second image section during depiction on the reproduction unit is fulfilled) and may occasionally also function as control unit for the image capture unit and/or the reproduction unit (view system-ECU) and may receive control signals of the image capture unit and/or the reproduction unit and/or may output control signals to the image capture unit and/or the reproduction unit. Alternatively, the image capture unit and/or the reproduction unit may also be controlled by a vehicle-related control unit (vehicle-ECU). The processing unit is provided either separately from the image capture unit or the reproduction unit or is integrated in the image capture unit or the reproduction unit.

The reproduction unit may be mounted inside a driver's cabin such that the driver may view it without any effort (such as at a left or right A-column or in the center) and may be a monitor, such as a TFT-, LCD-, OLED-monitor, etc. The image capture unit may comprise one or more cameras with a CMOS or CCD-technology.

The image capture unit may be comprised of two or more cameras which capture at least one first image section and one second image section with a very high resolution which is the same for all cameras such that the area of view of the image sensor in total has a high resolution over its entire surface. Preferably, however, the image capture unit has a single camera which has further preferably one single image sensor with a high resolution. A single camera, in particular with a single sensor, is configured actively by using and selecting special lens arrangements as optical elements such that requirements which contradict each other actually, such as a wide angle depiction, i.e., a depiction with a large image angle, and a substantially distortion-free and distortion-poor depiction with a high resolution, such as a main field of view depiction, may be achieved simultaneously for the desired field of view. A camera with a single image sensor is, for instance, described in the not published German Patent Application DE 10 2017 108 569.6 whose content is incorporated herein by reference. A single camera has the advantage that the resolution during taking out of another image section at a modified position is not changed abruptly from a high resolution to a low resolution. Further, no switching is necessary, in order to use the complete wide angle field of view during taking out the image section. Furthermore, a cost-efficient view system is achieved by a single camera.

The first image section may, at least in the original position, comprise a first legally prescribed field of view and/or the second image section may comprise a second legally prescribed field of view. In this respect, it is conceivable that during displacing the first and/or the second image section the first original image section is still shown as an additional third image section, in particular, if one of the displaced image sections no longer depicts the legally prescribed field of view and, thus, is depicted in addition to the legally prescribed field of view. Therefore, two image sections which correspond to two legally prescribed fields of view are shown at the operational position of the image sections at the original position. During sheering out of the trailer, three fields of view are then shown one of which corresponds to the first legally prescribed field of view at the original position, a further one corresponds to the first field of view at the modified position and the last one either corresponds to the second legally prescribed field of view at the original position or the second field of view at the modified position, depending on whether the second field of view is displaced or not. In this case, the first image section is not displaced and is not replaced by a first image section at a modified position, but is kept as a third additional image section. Further, it is conceivable that despite sheering out of the trailer both the first and also the second image section are still shown to the driver as additional image sections, while the first and the second image sections are displaced to a first and a second modified position, respectively. The depiction of the first and/or second image section at the original position may occur on one or more additional reproduction units. Preferably, however, the displacing of the first and/or the second image section to the respective modified position occurs presently without a simultaneous additional depiction of the first and/or the second image section at the corresponding original position.

Preferably, the first legally prescribed field of view of the first image section comprises a main field of view and/or the second legally prescribed field of view of the second image section comprises a wide angle field of view, such as they are defined in the EU-regulation ECE R46 as main field of view II and wide angle field of view IV. The resolutions in the main field of view and the wide angle field of view then have to correspond to the requirements in the ECE R46 in the operational position (minimum resolution).

Preferably, the first image section is positioned and oriented in the field of view of the image sensor such that it depicts a part of the tractor at the first original position such that the driver may also view a part of the environment adjacent to the tractor and has a better spatial orientation. In this respect, the part of the tractor may be depicted in the main field of view and/or the wide angle field of view.

According to a preferred embodiment, the first image section at the original position and the first image section at the modified position has a reference point of the trailer. For instance, the rear or front end of the trailer in the main driving direction, the trailer rear wheel, the last axis of the trailer, etc. may serve as reference point.

The reference point may be displaced during displacing the image section relative to the image section, i.e., may change its position relative to its original position at the modified displacement position. However, it is preferred that the reference point within the first image section at the first original position and at the first modified position is disposed at the same location on the image sensor such that it has, for instance, always the same distance to the edge of the reproduction unit and such that it simplifies for the driver to classify spatially the trailer in its environment. For instance, during the entire concerning, the end of the trailer stays in a certain distance to the vertical edge of the reproduction unit. Thus, the reference point only stays in the dynamic phase of tracking of the respective image section at the same location on the image sensor. In case the trailer sheers out without a displacement of the image section, i.e., in case of small steering angles or a small time delay, the reference point moves in the shown original image section and does not stay at the same position.

Preferably, the first image section and the second image section intersect each other on the image sensor, at least partially.

Preferably, the reproduction unit has a defined first display portion for reproduction of the first image section at the first original position and a defined second display portion for reproduction of the second image section at the second original position. For example, with a rectangular reproduction unit whose extension in the up-and-down-direction is larger than in the width direction, the first image section may take ⅔ of the upper reproduction surface of the reproduction unit, while the second image section takes ⅓ of the lower reproduction surface of the reproduction unit, or the first image section may take ¾ of the upper reproduction surface of the reproduction unit, while the second image section takes ¼ of the lower reproduction surface of the reproduction unit. Alternatively, both image sections may also be arranged adjacent to each other, i.e., in a horizontal adjacent/adjoining arrangement. It is preferred that the first image section is shown in a larger display portion concerning its surface than the second image section, in order to ensure that the first image section has a higher resolution than the second image section during reproduction.

Preferably, the ratio between the size of the first defined display portion to the size of the second defined display portion is fixed/unchangeable, in order to allow the driver always a reliable classification of the vehicle environment shown on the display portions. However, it is also conceivable that the size of the first defined display portion in relation to the size of the second defined display portion is changed, if this is required for a better depiction of the vehicle environment. For instance, the depictions of the first image section and the second image section, e.g., the main field of view and the wide angle field of view, may be reversed or the partition of the entire reproduction surface of the reproduction unit may be changed in view of the original partition during depiction of the image sections at the original positions, such as from original 1:3 to 1:4, etc.

Preferably, the portion which is depicted by the first image section and/or the second image section at the modified position is arranged closer to or farther away from the tractor than the portion which is depicted by the first image section and/or the second image section at the original position.

Alternative or additionally, the size of the first image section and/or the size of the second image section at the modified position is the same as the size of the first image section and/or the size of the second image section at the original position. However, it is also conceivable that the size of the first image section and/or the size of the second image section at the modified position in view of the size of the first image section and/or the size of the second image section at the original position is changeable (smaller or larger), if this promotes a better understanding of the vehicle environment.

Alternatively or further additionally, the aspect ratio of the first image section and/or the aspect ratio of the second image section at the modified position is the same as the aspect ratio of the first image section and/or the aspect ratio of the second image section at the original position. However, it is also conceivable that the aspect ratio of the first image section and/or the aspect ratio of the second image section at the modified position in view of the aspect ratio of the first image section and/or the aspect ratio of the second image section at the original position is changeable, if this promotes a better understanding of the vehicle environment.

A changeable size or a changeable aspect ratio, in particular of the first image section, is in particular then advantageous if during displacing of the first and/or the second image section to the modified position, the first image section at the original position is kept as an additional third image section, in order to comply with the legal requirements, in particular with respect to permanent displaying of the legally defined fields of view. In this case, it is possible to enlarge/down-size the first image section at the modified position as desired, to change its shape or aspect ratio, regardless of legal requirements, because the legal requirements are maintained by keeping the first image section at the original position in addition to the first image section at the modified position.

Preferably, the first display portion is adapted to reproduce the first image section at the same time at the original and the modified position and the second display portion is adapted to reproduce the second image section. In this respect, the first image section at the original position may have a scaling which is changed in a direction horizontally orthogonal to the vehicle longitudinal axis in view of the first image section at the modified position. In other words, the display portions of the reproduction unit may be configured such that both the first image section at the original position and also at the modified position is shown on a display portion arranged at the top, i.e. in the first display portion, in a mounted state of the reproduction unit, and that the second image section is shown on a display portion arranged at the bottom, i.e. in the second display portion, in a mounted state of the reproduction unit. In this respect, the first image section at the original position has another scaling in the direction horizontally orthogonal to the vehicle longitudinal axis than the first image section at the modified position in the direction horizontally orthogonal to the vehicle longitudinal axis. Specifically, the first image section at the original position is shown compressed in view of the first image section at the modified position, i.e., for instance, pixel columns in the direction horizontally orthogonal to the vehicle longitudinal axis are missing. So, the driver may even better evaluate the vehicle environment on the side of the vehicle on which the view system is mounted in that at least a part of the vehicle on the reproduction unit is recognizable/viewable in a compressed manner.

Preferably, the processing unit is adapted to receive signals for describing the angle relation between the tractor and the trailer from a signal device which is mounted on the vehicle. Dependent on the control signal, the processing unit takes a first and/or a second image section at a modified first and/or second position from the area of view of the sensor or not. In this respect, the signal device may be adapted for generating a manual control signal, whereby the driver may require a taking out of another image section from the field of view depending on the driving situation, if he cannot reliably view into the environment around the vehicle. Additionally or alternatively, the signal device may comprise a vehicle sensor which is adapted for generating the control signal. The signal device for generation of a manual control signal may comprise a door operator control panel, a touch pad/screen, an instrument panel, etc. The vehicle sensor may comprise a device for detecting a steering angle and/or a kink angle of the trailer, a wheel position, a gear rate sensor, an ABS sensor, an image analysis device, etc. In particular, each sensor is suitable which may generate a signal for detecting the orientation of the trailer relative to the tractor.

Preferably, the processing unit adapts continuously the first and the second image sections at the first and second modified position based on the control signal to the operational situation of the vehicle and over the entire area of view, for instance, the entire wide angle field of view, such that the driver may view into the environment around the vehicle, in particular the trailer, at any time and the operational safety of the vehicle is increased by a depiction which is adapted to the driving situation (so-called trailer panning/trailer tracking). In other words, the at least one tracked (displaced) image section may take endless numbers of positions during the operation of the vehicle in case of a dynamic tracking.

The operational situation may be cornering (to the front or to the rear).

According to a further aspect, the present invention has a view system arrangement which has two view systems as described above. Both view systems may be mounted at a left and a right outer side of a driver's cabin of a vehicle and may be configured mirror invertedly to each other. The processing units of the two view systems may communicate with each other such that they exchange data. For instance, the processing units of the particular view systems may exchange image/video data or control commands. The data exchange occurs preferably via a cable connection of the on-board bus system (CAN-bus). However, there are also other kinds of data transmission between the processing units conceivable, such as via Bluetooth or WLAN. Dependent on the exchanged data, both view systems may displace the first image section and/or the second image section from the first and the second original position, respectively, to a first and second modified position, respectively, or only one of the two view systems may displace at least one of the original image sections to a modified position, while the other image sections stay at the respective original position, during sheering out of the trailer. An exchange of data between the two view systems has the advantage that the algorithms forming the basis for the data processing and editing, respectively, may run in a more stable manner. For instance, by means of a data exchange between two view systems mounted on a vehicle, it may be assessed whether the signals which are received by the single/particular view systems from the signal devices are correct by comparing the signals with the signals which have been received by the other one the two view systems (correction algorithm).

According to a further aspect of the present invention, a mirror replacement system for a vehicle, in particular a commercial vehicle with tractor and trailer, has a view system which is configured as described above or a view system arrangement with two view systems as described above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is described exemplarily based on the enclosed figures, wherein the same reference numerals refer to the same components. It is shown in.

DETAILED DESCRIPTION OF THE PRESENTLY PREFERRED EMBODIMENTS

Figure 1A:
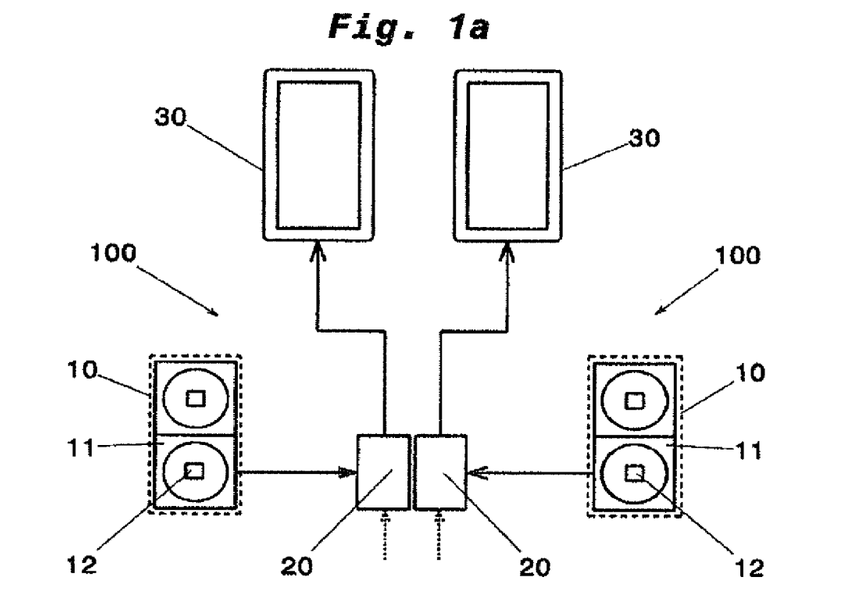
FIG. 1a shows two view systems for a vehicle according to the invention.

FIG. 1a shows two view systems 100 each of which being capable to be mounted on the left and right of an outer side of a driver's cabin of a vehicle, in particular a commercial vehicle such as a truck. Each view system 100 has an image capture unit 10 which has two cameras 11 each with one image sensor 12. Alternatively, the image capture unit 10 may also have more than two cameras 11 and/or each camera 11 may have more than one image sensor 12. Further, each view system 100 has a processing unit 20 and a reproduction unit 30. The processing unit 20 is coupled to the image capture unit 10 and the reproduction unit 30. Occasionally, each processing unit 20 may be coupled with further system components (see dashed lines).

The image capture unit 10 is adapted for capturing images of a vehicle environment in the form of image data, e.g. video data. The processing unit 20 processes and edits the image data captured by the image capture unit such that these may be reproduced by the reproduction unit 30. In particular, the processing unit processes the image data such that the first image section always has a higher resolution during depiction on the reproduction unit 30 than the second image section during depiction on the reproduction unit 30 (e.g., by suitable scaling of the first and the second image sections). Additionally, the processing unit 20 may also output and receive control signals, for instance, to and from, respectively, the image capture unit 10 and/or the reproduction unit 30.

Figure 1B:
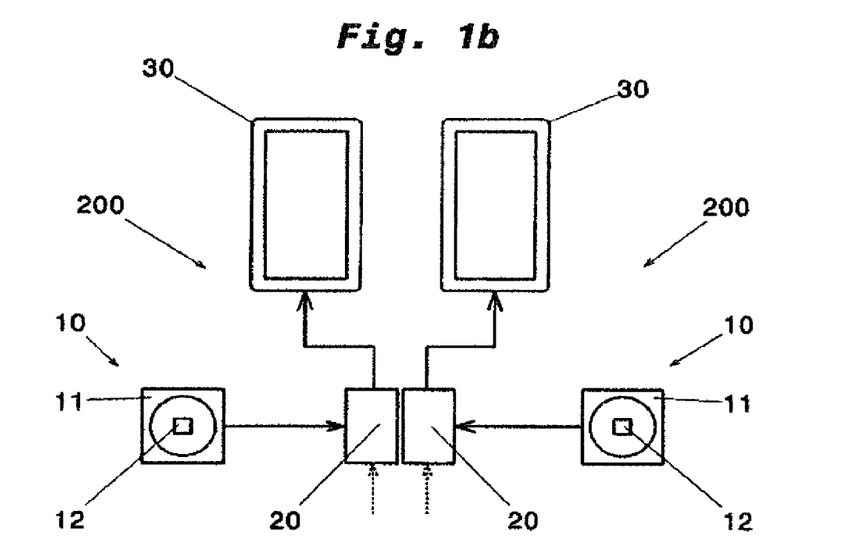
FIG. 1b shows two view systems for a vehicle according to the invention in accordance with an alternative embodiment.

In FIG. 1b, an alternative embodiment of a view system 200 according to the invention is shown. Contrary to the view system 100 shown in FIG. 1a, the view system 200 shown in FIG. 1b has only one camera 11 with an image sensor 12. The camera 11 may have a single or a plurality of image sensors 12 and is adapted to capture an area of view around the vehicle which comprises either a main field of view and a wide angle field of view (such as defined in the ECE R46).

Figure 2:
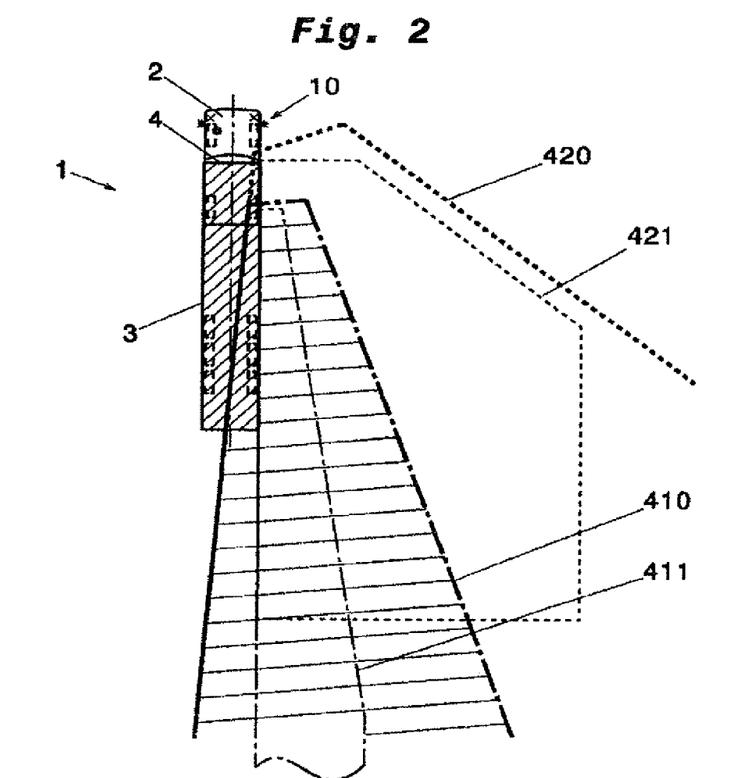
FIG. 2 is a plan view of a vehicle with tractor and trailer in aligned arrangement and a first image section and a second image section at an original position.

FIG. 2 shows a plan view of a vehicle 1 with a tractor 2 and a trailer 3. With the driving situation depicted in FIG. 2, the tractor 2 and the trailer 3 are substantially aligned in the longitudinal direction of the vehicle 1 such as during driving straight forward or driving straight rearward (see chain line in FIG. 2). In this respect, the term "substantially align" comprises small steering angles which do not require an adaptation (tracking) of the image section.

Figure 3:
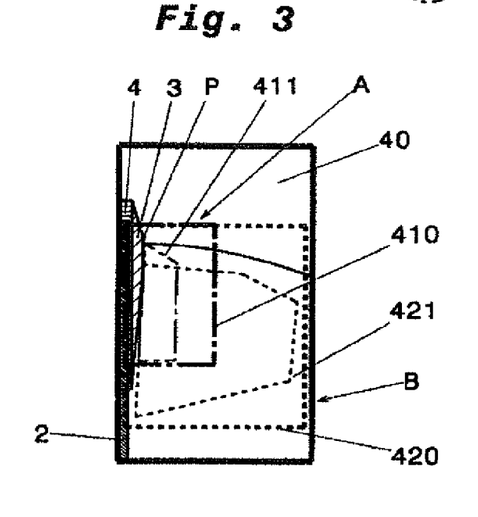
FIG. 3 shows an area of view of an image capture unit with the first image section and the second image section at the original position of FIG. 2.

FIG. 3 shows the capture portion and view portion 40 of the image sensor 12 of the image capture unit during the driving situation shown in FIG. 2, i.e., driving straight forward or driving straight rearward. As to be seen in FIG. 3, the camera 11 of the view systems 100, 200 is adapted to capture one single common area of view 40 which corresponds to the sensor surface on which the environment around the vehicle 1 is captured. With a single common area of view, an area of view is meant which comprises either a main field of view and a wide angle field of view (such as defined in the ECE R46). That is, independent on whether the image capture unit is comprised of a plurality of cameras 11 or only of a single camera 11, it takes a single area of view. With a plurality of cameras 11 or with a single camera 11 with a plurality of image sensors 12, the common area of view 40 is generated by a suitable calculation software which compiles/pieces together the images of the cameras 11 and the image sensors 12, respectively, to a common area of view 40. With a single camera 11 with a single image sensor 12, the area of view 40 is generated by a suitable lens arrangement as optical element such that actually contradicting requirements, such as a wide angle depiction, i.e., a depiction with a large image angle, and a substantially distortion-free and distortion-poor depiction with a higher resolution, such as a main field of view depiction, may be achieved for the desired field of view.

The area of view 40 comprises a first image section 410 which comprises again a legally prescribed main field of view 411. Further, the area of view 40 comprises a second image section 420 which again comprises a legally prescribed wide angle field of view 421. The requirements to legally prescribed main fields of view and wide angle fields of view are, for instance, defined in the ECE R46. As can be taken from FIG. 3, the second image section 420 comprises both the legally prescribed wide angle field of view 421, the first image section 410 and the legally prescribed wide angle field of view 421 as well as a part of a tractor 2 and a trailer 3 of the vehicle 1. The first image section 410 is disposed in the driving situation shown in FIG. 3, i.e., with a tractor 2 and a trailer 3 which are aligned in the longitudinal direction, at a first original position A. The second image section 410 is disposed in the driving situation shown in FIG. 3 at a second original position B.

The first image section 410 and the legally prescribed main field of view 411 comprised therein as well as the second image section 420 and the legally prescribed wide angle field of view 421 comprised therein are also to be seen in the plan view of FIG. 2.

Figure 4:
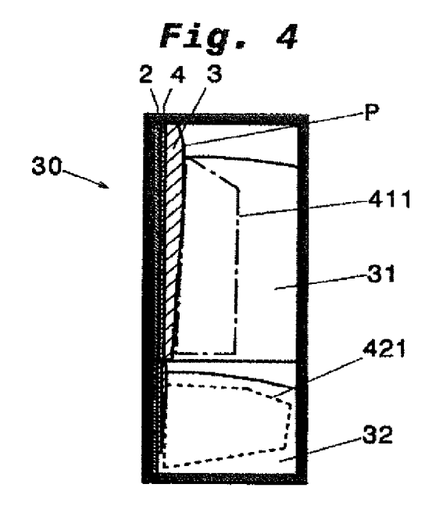
FIG. 4 is a reproduction unit which depicts the first image section and the second image section at the original position of FIGS. 2 and 3.

FIG. 4 shows a reproduction unit 30 which has a rectangular form with a longer extension in an up-and-down-direction than in a width direction in FIG. 4 and a first display portion 31 and a second display portion 32. The first display portion 31 is disposed above the second display portion 32 in a state of the reproduction unit 30 mounted on the vehicle 1 and covers around ⅔ of the entire display surface of the reproduction unit 30. Thus, the second display portion 32 is disposed beneath the first display portion 31 in a state of the reproduction unit 30 mounted on the vehicle 1 and correspondingly covers around ⅓ of the entire display surface of the reproduction unit 30. In the first display portion 31, the first image section 410 which comprises the legally prescribed main field of view 411 is reproduced. In the second display portion 32, the second image section 420 which comprises the legally prescribed main field of view 421 is reproduced. Specifically, the first image section 410 at the original position A corresponds to the first display portion 31 and the second image section 420 at the original position B corresponds to the second display portion 32.

As shown in FIG. 3, the second image section 420 during capturing by the image capture unit 10 is larger than the first image section 410 during capturing by the image capture unit 10. Contrary to this, however, the first image section 410 during depiction on the reproduction unit 30 is larger than the second image section 420 during depiction on the reproduction unit 30. For this, the second image section 420 during capturing is changed and reduced, respectively, related to the first image section 410 during capturing with respect to its size by the processing unit 20 such that it is smaller than the image section 410 during its reproduction. Due to the size reduction, the resolution of the second image section 420 is also reduced. The size of the first image section 410 may either be maintained or may be reduced in a smaller degree than the second image section 420. As long as the minimum requirements to the resolution are met, the first image section 410 may also be enlarged. This ensures that the first image section 410 during depiction on the reproduction 30 always has a higher resolution than the second image section 420 during depiction on the reproduction unit 30.

As shown in FIG. 4, in the first display portion 31, the driver views a part of the tractor 2 and the rear edge of the trailer 3 (with a reference point P on the rear edge of the trailer 3) and, thus, may reliably evaluate the environment around the vehicle, in particular around the trailer.

As soon as the trailer 3 of the vehicle 1 starts to move from the arrangement aligned in the longitudinal direction of the tractor 2 during a driving maneuver, such as cornering or turning, to an arrangement angled to the tractor, the first image section 410 is displaced by the processing unit 20 such that the reference point P is still to be seen in the first image section. In order to avoid that the processing 20 starts to displace the first image section 410 even with small steering movements of the driver, which usually occur with driving straight forward or driving straight rearward, in order, for example, to keep the lane, a displacement of the first image section 410 by the processing unit 20 does not occur before a certain, fixedly defined angle between trailer 3 and tractor 2 is reached. Alternatively or additionally, it is also conceivable that the processing unit 20 starts to displace the first image section 410 with a certain fixedly defined time delay, i.e., if the trailer 3 and the tractor 2 have also not re-taken the aligned arrangement after a certain time period has lapsed.

Figure 5:
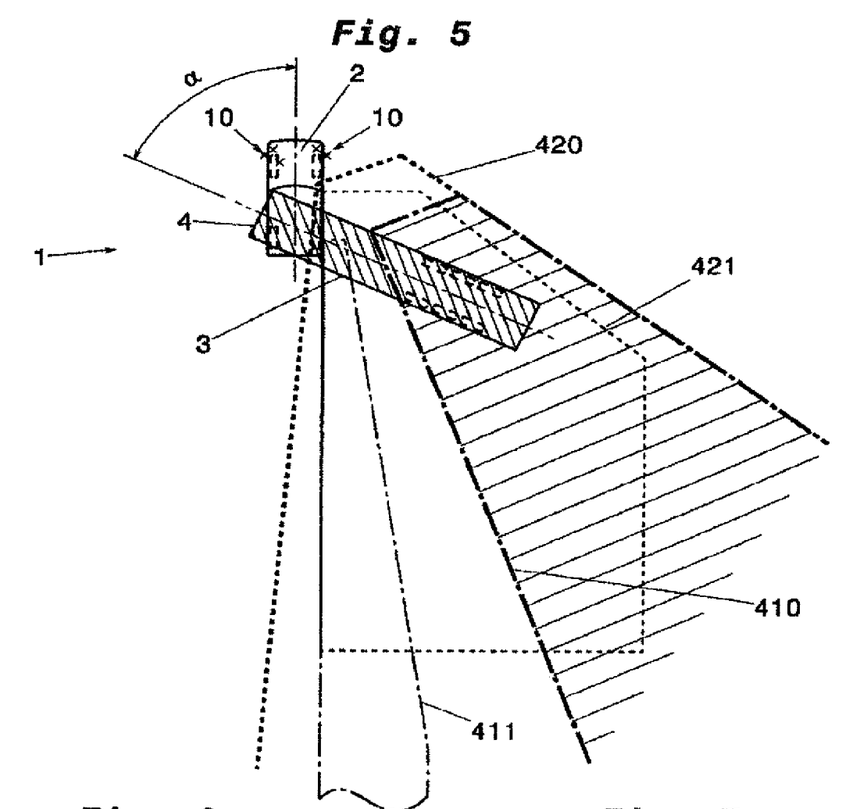
FIG. 5 is a plan view of a vehicle with tractor and trailer in an arrangement angled to each other and a first image section at a modified position and the second image section at the original position of FIG. 2.

FIG. 5 shows a plan view on the vehicle 1 wherein the tractor 2 and the trailer 3 are no longer aligned in the longitudinal direction of the vehicle 1, but are arranged angled to each other, such as during cornering or turning of the vehicle 1. Specifically, the trailer 3 is arranged in an angle $\alpha$ to the tractor 2. Preferably, a displacement of a corresponding image section does not start before reaching a particular angle $\alpha$, such as not before reaching $=\geq 30°$, preferably $\alpha \geq 20°$, further preferably $\alpha \geq 10°$ and still further preferably $\alpha \geq 5°$.

Figure 6:
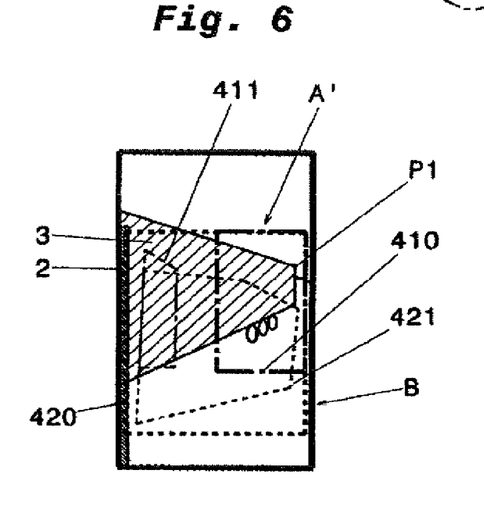
FIG. 6 shows an area of view of the image capture unit with a first image section at the modified position of FIG. 5 and the second image section at the original position of FIG. 2.

FIG. 6 shows the capture portion and the area of view 40 of the image sensor 12 of the image capture unit 10 during a driving situation shown in FIG. 5, i.e., during cornering or turning. As in FIG. 3, the area of view 40 has the first image section 410 and the second image section 420. However, during the driving situation which forms the basis for FIG. 6, i.e. cornering or turning, the first image section 410 is disposed at a first modified position A', while the second image section 420 is still at the second original position B.

In other words, the first image section 410 during the driving situation shown in FIG. 6 is taken from the processing unit 20 at another location/position of the area of view 40 and is displaced continuously to this other location by taking a plurality of intermediate positions than during the driving situation shown in FIG. 3. Specifically, it can be seen in FIG. 6 that the first image section 410 is taken from the area of view 40 at a position A' such that the first image section 410 comprises the rear edge of the trailer 3 and, thus, the reference point P. The reference point P allows the driver to classify the trailer 3 in its environment and to evaluate how big the angle $\alpha$ is between the tractor 2 and the trailer 3. The first image section 410 shown in FIG. 6 no longer comprises the legally prescribed main field of view 411 at the positon A', but only the second image section 420 which is disposed also during the driving situation shown in FIG. 6 still at the original position B, still comprises the legally prescribed wide angle field of view 412.

Figure 7:
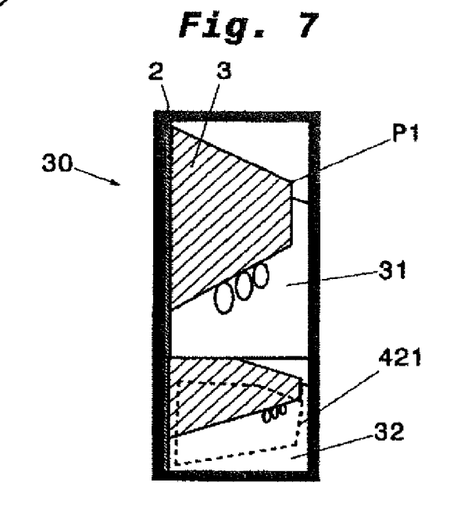
FIG. 7 is a reproduction unit which depicts the first image section at the modified positon of FIG. 5 and the second image section at the original position of FIG. 2.

FIG. 7 shows the reproduction unit 30 described in FIG. 4 with the first display portion 31 and the second display portion 32. As also shown in FIG. 4, the first display portion 31 is disposed above the second display portion 32 in a state mounted on the vehicle 1 and covers around ⅔ of the entire display surface of the reproduction unit 30, and the second display portion 32 correspondingly covers around ⅓ of the entire display surface of the reproduction unit 30 beneath the first display portion 31. Contrary to the reproduction unit 30 shown in FIG. 4, with the reproduction unit 30 shown in FIG. 7, the first image section 410 is reproduced at the modified position A', but not the legally prescribed main field of view 411. In the second display portion 32, as in FIG. 4, the second image section 420 which comprises the legally prescribed main field of view 421 is reproduced. Specifically, the first image section 410 at the modified position A' corresponds to the first display portion 31 and the second image section 420 corresponds to the second display portion 32.

It is also conceivable that only the second image section 420 is displaced or both image sections 410, 420 are displaced. Independent on which one of the image sections 410, 420 is displaced and how far it is displaced, it has always to be ensured that the first image section 410 on the reproduction unit 30 is depicted with a higher resolution than the second image section 420. This may occur, as described above, by a suitable scaling of the first and/or the second image sections 410, 420.

The processing unit 20 preferably receives a control signal from a signal device (not shown), in order to show the processing unit 20 that the trailer 3 moves relative to the tractor 2 from the aligned arrangement into the angled arrangement. The signal device may be a signal device which is to be manually operated by the driver, such as a touch pad/touch screen, a door operator control panel, etc. If the driver recognizes that he no longer views into the environment around the vehicle, in particular around the trailer, and, thus, no longer views a predetermined relevant reference point, thus, he may signal to the processing unit 20 by means of a manual input to displace the concerned image section 410, 420 correspondingly such that he can re-view the environment around the trailer and the reference point. In this case, the driver defines the amount of displacement. Alternatively or additionally, the signal device may be an automatic signal device, such as a steering angle sensor, a position sensor, etc. The automatic signal device permanently detects whether the trailer 3 is still disposed in the arrangement aligned to the tractor 2. As soon as the automatic signal device detects an angled arrangement between the trailer 3 and the tractor 2, it outputs a signal to the processing unit 20 which comprises also an information how big the angle is between the trailer 3 and the tractor 2, such that the processing unit 20 may displace the corresponding image section 410, 420 to a position A' and may take the corresponding image section 410, 420 from the area of view 40 at a position A', respectively, which allows the driver to view the reference point P at the trailer 3.

Figure 8:
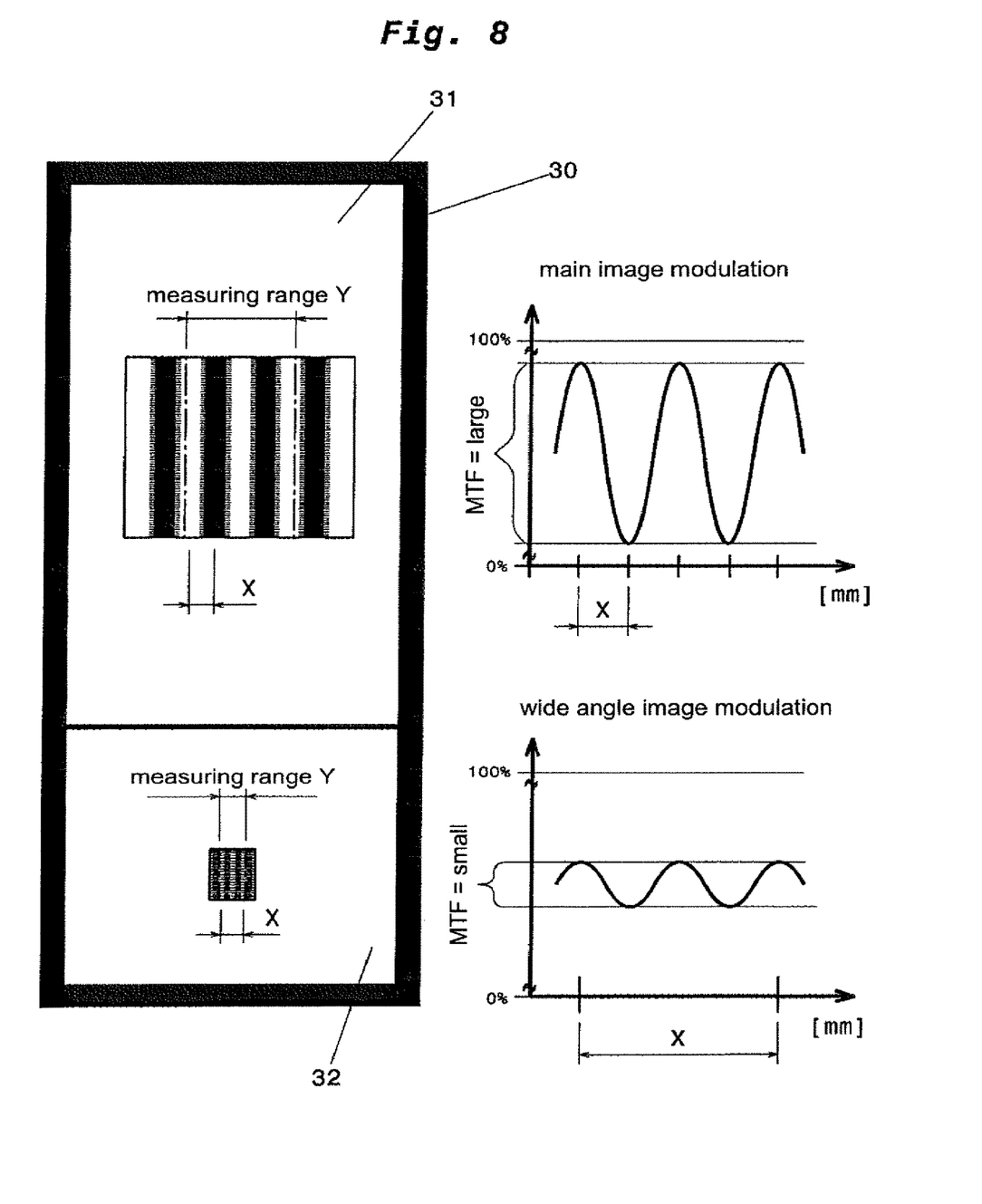
FIG. 8 is a reproduction unit which depicts schematically a first image section and a second image section by means of a modulation transfer function.

FIG. 8 shows a reproduction unit 30 with a first and a second display portion 31, 32 as they have already been described with respect to FIGS. 4 and 7. In the first display portion 31, a main field of view is schematically depicted by means of a line raster (grey scale depicted by short dashes at the black lines which run in the right-left-direction in FIG. 8), such as it is used in a modulation transfer function (MTF). The line raster depicts the object contrast. In the second display portion 32, a wide angle field of view is schematically shown by means of a line raster. In both line rasters, a measuring range Y is defined which comprises always four lines. Within each of the measuring ranges Y, a measured value X is defined which has an identic value/amount in the main field of view depiction and the wide angle field of view depiction. In the line raster for a main field of view shown in the first display portion 31, the measured value X corresponds to the width of a line, while in the line raster for a wide angle field of view which is shown in the second display portion 32, the measured value X corresponds to the width of four lines and, thus, to the measuring range Y. The lines of both the line rasters of the main field of view in the display portion 31 and of the wide angle field of view in the display portion 32 run in the image plane of FIG. 8 from up to down and have fixed distances.

The modulation transfer function MTF is an assessment criterion for incoherent depictions. Specifically, the modulation transfer function is a measure for the definition/sharpness and the contrast of the depiction and is defined as the ratio of the image contrast to the object contrast or the ratio of the real image contrast to the ideal image contrast.

On the right, adjacent to the depiction of the main field of view and the depiction of the wide angle field of view, the corresponding line raster is depicted in a sinus-shaped image modulation. The sinus-shaped image modulation depicts the image contrast. As can be taken from the sinus-shaped image modulations each of which being associated with the main field of view and the wide angle field of view, respectively, the relation of the image contrast to the object contrast in the main field of view is larger (high amplitude with small wavelength) than in the wide angle field of view (small amplitude with large wavelength). Thus, the measured value X in the sinus-shaped image modulation of the main field of view comprises an extension of exactly half a wavelength, while the measured value X in the sinus-shaped image modulation of the wide angle field of view comprises exactly two wavelengths. Thus, the distance between the line pairs of the line raster of the main field of view is smaller than the distance between the line pairs of the line raster of the wide angle field of view why the main field of view always has a higher resolution than the wide angle field of view.

The modulation transfer function shown in FIG. 8 is one of a plurality of ways to describe and to define, respectively, the resolution of an image and is presently the preferred way of description. Of course, other resolution ways are also conceivable such as the indication of pixels per defined depiction surface.

Figure 9:
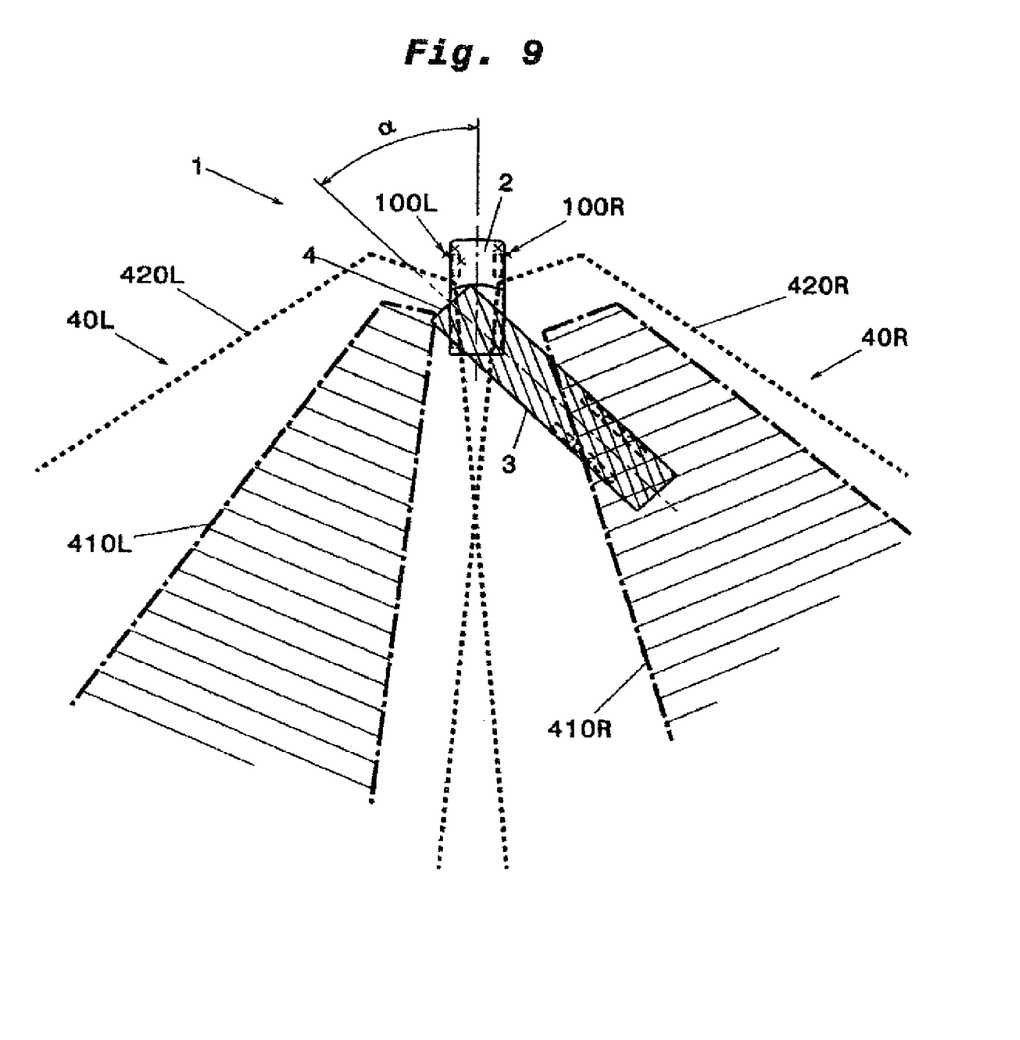
FIG. 9 shows a plan view of a vehicle with tractor and trailer in an arrangement angled to each other and a view system arrangement according to the invention with a view system arranged left and right at the vehicle.

FIG. 9, as FIG. 5, shows a plan view of the vehicle 1 wherein the tractor 2 and the trailer 3 are no longer aligned in the longitudinal direction of the vehicle 1, but are arranged in an angled manner to each other, such as during cornering or turning of the vehicle 1. Specifically, the trailer 3 is arranged in an angle α relative to the tractor 2. Further, in the embodiment shown in FIG. 9, a view system 100L is arranged at a left outer side of the tractor 2 in a main driving direction and a view system 100R is arranged at a right outer side of the tractor 2 in a main driving direction. The view systems 100L, 100R correspond to the view system 100, but may also correspond to the view system 200. Both view systems 100L, 100R are configured such that they may exchange data, such as image data, control commands, etc., among each other.

The view system 100L captures an area of view 40L of the environment on a left side of the vehicle 1 in main driving direction. The area of view 40L comprises a wide angle field of view 420L and a main field of view 410L. The view system 100R captures an area of view 40R of the environment on a right side of the vehicle 1 in main driving direction. The area of view 40R comprises a wide angle field of view 420R and a main field of view 410R.

Figure 10:
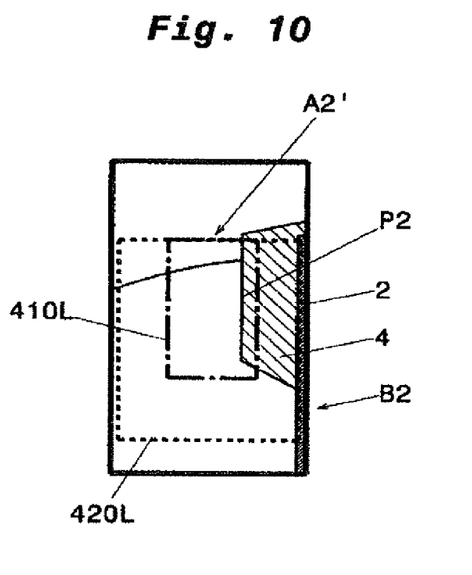
FIG. 10 shows an area of view of the left view system.

FIG. 10 shows the capture area and the area of view 40L, respectively, of the image sensor of the view system 100L in the driving situation shown in FIG. 9, i.e., during cornering or turning. As shown in FIG. 9, the area of view 40L has the first image section 410L and the second image section 420L. However, in the driving situation which forms the basis for FIG. 10, i.e., cornering or turning, the first image section 410L is disposed at a first modified position A2', while the second image section 420L is disposed at a second original position B2. In other words, in the driving situation which forms the basis for FIG. 10, the first image section 410L is taken out from the area of view 40L at another location by the processing unit of the view system 100L and is displaced continuously by the processing unit of the view system 100L to this other location A2' by taking a plurality of intermediate positions than in a driving situation wherein the tractor 2 and the trailer 3 are substantially aligned. Specifically, it is to been seen in FIG. 10 that the first image section 410L is taken from the area of view 40L at a position A2' such that the first image section 410L comprises a part of an end surface 4 of the trailer 3 (the surface of the trailer which faces the tractor 2 in a substantially aligned arrangement) and a reference point P2. The reference point P2 is presently positioned approximately in the center of a left edge of the end surface 4 in the main driving direction, but may also be positioned on any other location of the end surface 4. The reference point P2 allows the driver an evaluation of the trailer 3 in its left environment and an evaluation how big the angle α is between the tractor 2 and the trailer 3. As in the above described embodiments, the first image section 410L which is shown in FIG. 10 no longer comprises a (not drew-in) main field of view at the position A2', but only the second image section 420L which is also disposed in the driving situation which forms the basis for FIG. 10 still at the original position B2 continuously comprises a (not drew-in) wide angle field of view.

Figure 11:
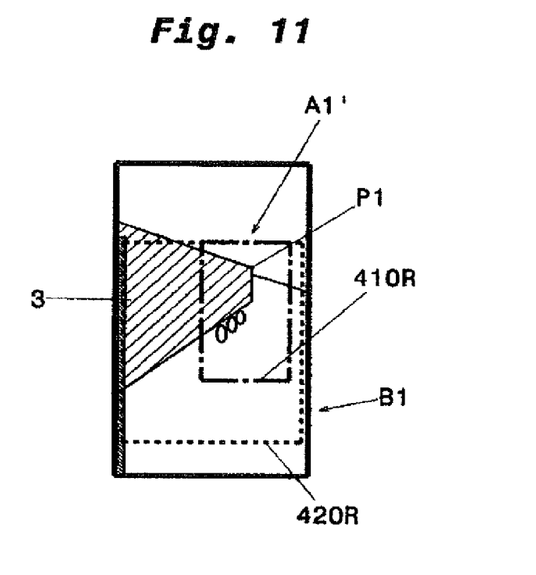
FIG. 11 shows an area of view of the right view system.

FIG. 11 shows the capture area and the area of view 40R, respectively, of the image sensor of the view system 100R in the driving situation shown in FIG. 9, i.e., during cornering or turning. As shown in FIG. 9, the area of view 40R has the first image section 410R and the second image section 420R. However, in the driving situation which forms the basis for FIG. 11, i.e., cornering or turning, the first image section 410R is disposed at a first modified position A1', while the second image section 420R is disposed at a second original position B1. In other words, in the driving situation which forms the basis for FIG. 11, the first image section 410R is taken out from the area of view 40R at another location by the processing unit of the view system 100R and is displaced continuously by the processing unit of the view system 100R to this other location A1' by taking a plurality of intermediate positions than in a driving situation wherein the tractor 2 and the trailer 3 are substantially aligned. Specifically, it is to been seen in FIG. 11 that the first image section 410R is taken from the area of view 40R at a position A1' such that the first image section 410R comprises a part of a rear edge of an end surface 4 of the trailer 3 and a reference point P1. The reference point P1 is presently positioned at an upper corner of the rear edge, but may also be positioned on any other location of the rear edge of the end surface 4 of the trailer 3 or at any other reference position. The reference point P1 allows the driver an evaluation of the trailer 3 in its right environment and an evaluation how big the angle α is between the tractor 2 and the trailer 3. As in the above described embodiments, the first image section 410R which is shown in FIG. 11 no longer comprises a (not drew-in) main field of view at the position A1', but only the second image section 420R which is also disposed in the driving situation which forms the basis for FIG. 11 still at the original position B1, continuously comprises a (not drew-in) wide angle field of view.

Figure 12:
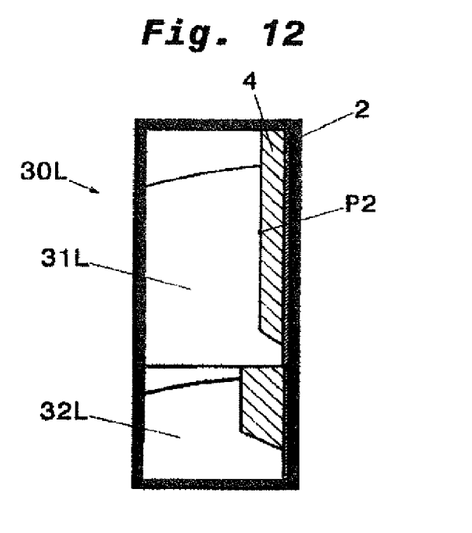
FIG. 12 is a left reproduction unit which shows a left vehicle environment.

FIG. 12 shows a reproduction unit 30L with a first display portion 31L and a second display portion 32L which reproduces a left vehicle environment. The reproduction unit 30L corresponds to the above described reproduction unit 30. In the reproduction unit 30L shown in FIG. 12, the first image section 410L at the modified position A2' corresponds to the display portion 31L and the second image section 420L corresponds to the second image section 420L at the original position B2.

Figure 13:
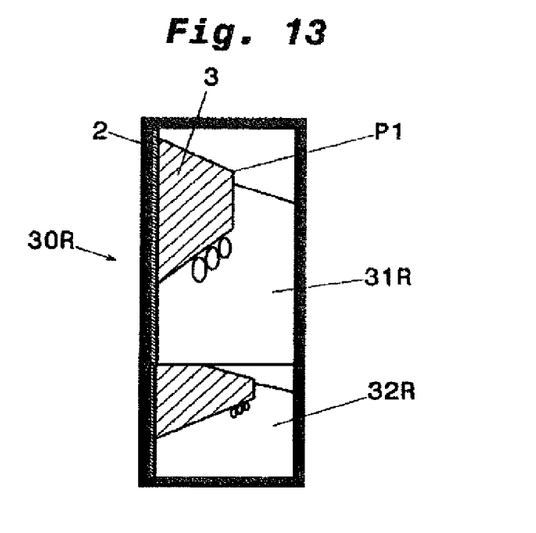
FIG. 13 is a right reproduction unit which shows a right vehicle environment.

FIG. 13 shows a reproduction unit 30R with a first display portion 31R and a second display portion 32R which reproduces a right vehicle environment. The reproduction unit 30R corresponds to the above described reproduction unit 30. In the reproduction unit 30R shown in FIG. 13, the first image section 410R at the modified position A1' corresponds to the display portion 31R and the second image section 420R corresponds to the second image section 420R at the original position B1.

The left and right vehicle environment may also be depicted in a common reproduction unit 30.

In the embodiments shown in FIGS. 9 to 13, both the left and the right view systems 100L, 100R displace the first image section 410L, 410R such that also with each sheering out of the trailer 3 relatively to the tractor 2, the environment on the left and right side around the vehicle may be viewed by the driver. However, it is also conceivable that only the first left image section 410L or the first right image section 410R or three of the first and second image sections 410L, 4210R, 420L, 420R or all first and second image sections 410L, 410R, 420L, 420R are displaced.

It is explicitly stated that all features disclosed in the description and/or the claims are intended to be disclosed separately and independently from each other for the purpose of original disclosure as well as for the purpose of restricting the claimed invention independent on the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A view system for a vehicle with a tractor and a trailer, comprising:
    a capture unit for capturing an area of view around the vehicle in form of image data, wherein the capture unit is attachable to the tractor, wherein the capture unit has a single camera having a single image sensor,
    at least one processing unit for processing the image data captured by the capture unit, and
    at least one reproduction unit for reproducing at least one first image section and one second image section of the area of view captured by the capture unit, wherein each reproduction unit has a defined first display portion for reproduction of the first image section and a defined second display portion for reproduction of the second image section and wherein the first image section comprises a main field of view and the second image section comprises a wide angle field of view, wherein the second image section comprises the first image section,
    wherein, if the tractor and the trailer are substantially aligned in the longitudinal direction of the vehicle, each processing unit takes the first image section at a first original position (A) and the second image section at a second original position (B) from the area of view of the single image sensor, and
    wherein, if the tractor and the trailer are arranged in an angle substantially unequal 0° to each other, each processing unit takes the first image section at either (i) a first modified position (A') or (ii) the second image section at a second modified position (B') from the area of view of the single image sensor, but not at both (i) and (ii), and
    wherein the resolution of the first image section at the original position (A) and at the modified position (A') on each reproduction unit is higher than the resolution of the second image section at the original position (B) and at the modified position (B') on each reproduction unit, the resolution corresponding to the number of image pixels per unit area of the reproduction unit.

2. The view system according to claim 1, wherein the main field of view comprises a first legally prescribed field of view and/or the wide angle field of view comprises a second legally prescribed field of view.

3. The view system according to claim 1, wherein the first image section is positioned and oriented on the area of view of the image sensor such that it depicts a part of the tractor at the first original position (A).

4. The view system according to claim 1, wherein the first image section at the original position (A) and the first image section at the modified position (A') has a reference point (P) of the trailer.

5. The view system according to claim 4, wherein the reference point (P) is disposed within the first image section at the first original position (A) and at the first modified position (A') at the same location of the first image section.

6. The view system according to claim 1, wherein the first image section and the second image section intersect each other partially on the image sensor.

7. The view system according to claim 1, wherein the ratio of the size of the first defined display portion to the size of the second defined display portion is unchangeable.

8. The view system according to claim 7, wherein the size of the first image section and/or the size of the second image section at the modified position (A') is equal to the size of the first image section and/or the size of the second image section at the original position (A,B).

9. The view system according to claim 1, wherein the portion which is depicted by the first image section and/or the second image section at the modified position (A') is arranged closer to or farther away from the tractor than the portion which is depicted by the first image section and/or the second image section at the original position (A,B).

10. The view system according to claim 9, wherein the aspect ratio of the first image section and/or the aspect ratio of the second image section at the modified position (A') is equal to the aspect ratio of the first image section and/or the aspect ratio of the second image section at the original position (A,B).

11. The view system according to claim 1, wherein the first display portion is adapted to reproduce the first image section simultaneously at the original and the modified position, and the second display portion is adapted to reproduce the second image section.

12. The view system according to claim 11, wherein the first image section at the original position has a scaling which is changed in a direction horizontally orthogonal to the vehicle longitudinal axis in view of the first image section at the modified position.

13. The view system according to claim 1, wherein each processing unit is adapted to receive signals for describing the angle ratio between the tractor and the trailer from a signal device which is mounted on the vehicle and to take the first image section and/or the second image section based on the control signal at the modified first and/or second position or not.

14. The view system according to claim 13, wherein the signal device is adapted for generating a manual control signal.

15. The view system according to claim 13, wherein the signal device comprises a vehicle sensor which is adapted for generation of the control signal.

16. The view system according to claim 1, wherein each processing unit continuously adapts the first and second image section at the first and second modified position (A') to the operational situation of the vehicle based on the control signal.

17. The view system according to claim 16, wherein the operational situation is cornering.

18. A view system arrangement with two view systems according to claim 1, wherein processing devices of the two view systems are adapted to exchange data.

19. A mirror replacement system for a vehicle with a view system according to claim 1.

20. A view system for a vehicle with a tractor and a trailer, comprising:
a capture unit for capturing an area of view around the vehicle in form of image data, wherein the capture unit is attachable to the tractor, wherein the capture unit has a single camera having a single image sensor,
at least one processing unit for processing the image data captured by the capture unit, and
at least one reproduction unit for reproducing at least one first image section and one second image section of the area of view captured by the capture unit, wherein each reproduction unit has a defined first display portion for reproduction of the first image section and a defined second display portion for reproduction of the second image section,
wherein, if the tractor and the trailer are substantially aligned in the longitudinal direction of the vehicle, each processing unit takes the first image section at a first original position (A) and the second image section at a second original position (B) from the area of view of the single image sensor, and
wherein, if the tractor and the trailer are arranged in an angle substantially unequal 0° to each other, each processing unit takes the first image section at either (i) a first modified position (A') or (ii) the second image section at a second modified position (B') from the area of view of the single image sensor, but not at both (i) and (ii),
wherein the resolution of the first image section at the original position (A) and at the modified position (A') on each reproduction unit is higher than the resolution of the second image section at the original position (B) and at the modified position (B') on the reproduction unit, the resolution corresponding to the number of image pixels per unit area of the reproduction unit, and
wherein the first display portion is adapted to reproduce the first image section simultaneously at the original (A) and the modified position (A'), and the second display portion is adapted to reproduce the second image section (B, B').

21. A view system arrangement with two view systems for a vehicle with a tractor and a trailer, each view system comprising:
a capture unit for capturing an area of view around the vehicle in form of image data, wherein the capture unit is attachable to the tractor, wherein the capture unit has a single camera having a single image sensor,
at least one processing unit for processing the image data captured by the capture unit, and
at least one reproduction unit for reproducing at least one first image section and one second image section of the area of view captured by the capture unit,
wherein, if the tractor and the trailer are substantially aligned in the longitudinal direction of the vehicle, each processing unit takes the first image section at a first original position (A) and the second image section at a second original position (B) from the area of view of the single image sensor, and
wherein, if the tractor and the trailer are arranged in an angle substantially unequal 0° to each other, each processing unit takes the first image section at either (i) a first modified position (A') or (ii) the second image section at a second modified position (B') from the area of view of the single image sensor, but not at both (i) and (ii),
wherein the resolution of the first image section at the original position (A) and at the modified position (A')

on each reproduction unit is higher than the resolution of the second image section at the original position (B) and at the modified position (B') on each reproduction unit, the resolution corresponding to the number of image pixels per unit area of each reproduction unit, and wherein the processing devices of the two view systems are adapted to exchange data.

22. A view system for a vehicle with a tractor and a trailer, comprising:

a capture unit for capturing an area of view around the vehicle in form of image data, wherein the capture unit is attachable to the tractor, wherein the capture unit has a single camera having a single image sensor, at least one processing unit for processing the image data captured by the capture unit, and at least one reproduction unit for reproducing at least one first image section and one second image section of the area of view captured by the capture unit, wherein, if the tractor and the trailer are substantially aligned in the longitudinal direction of the vehicle, each processing unit takes the first image section at a first original position (A) and the second image section at a second original position (B) from the area of view of the single image sensor, and wherein, if the tractor and the trailer are arranged in an angle substantially unequal 0° to each other, each processing unit takes the first image section at either (i) a first modified position (A') or (ii) the second image section at a second modified position (B') from the area of view of the single image sensor, but not at both (i) and (ii), wherein the resolution of the first image section at the original position (A) and at the modified position (A') on each reproduction unit is higher than the resolution of the second image section at the original position (B) and at the modified position (B') on each reproduction unit, the resolution corresponding to the number of image pixels per unit area of each reproduction unit, and wherein the first image section at the original position (A) and the first image section at the modified position (A') has a reference point (P) of the trailer, wherein the reference point (P) is disposed within the first image section at the first original position (A) and at the first modified position (A') at the same location of the first image section.

* * * * *